US009250665B2

(12) United States Patent
Avkarogullari et al.

(10) Patent No.: US 9,250,665 B2
(45) Date of Patent: Feb. 2, 2016

(54) GPU WITH DYNAMIC PERFORMANCE ADJUSTMENT

(75) Inventors: Gokhan Avkarogullari, San Jose, CA (US); Patrick Y. Law, Cupertino, CA (US); Michael J. Wyrzykowski, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 656 days.

(21) Appl. No.: 13/595,305

(22) Filed: Aug. 27, 2012

(65) Prior Publication Data

US 2013/0328890 A1     Dec. 12, 2013

Related U.S. Application Data

(60) Provisional application No. 61/656,719, filed on Jun. 7, 2012.

(51) Int. Cl.
    *G06F 1/32*          (2006.01)
    *G06F 1/20*          (2006.01)

(52) U.S. Cl.
    CPC .............. *G06F 1/206* (2013.01); *G06F 1/3206* (2013.01); *G06F 1/3234* (2013.01); *Y02B 60/1275* (2013.01)

(58) Field of Classification Search
None
See application file for complete search history.

(56) References Cited

U.S. PATENT DOCUMENTS

| 6,067,083 | A | 5/2000 | Glen et al. |
| 6,076,171 | A | 6/2000 | Kawata |
| 6,657,634 | B1 | 12/2003 | Sinclair et al. |
| 6,687,844 | B1 | 2/2004 | Zhang |
| 6,820,209 | B1 | 11/2004 | Culbert et al. |
| 6,950,105 | B2 | 9/2005 | Giemborek et al. |
| 7,017,059 | B2 | 3/2006 | Law et al. |
| 7,256,795 | B2 | 8/2007 | Chen |
| 7,451,332 | B2 | 11/2008 | Culbert et al. |
| 7,490,254 | B2 * | 2/2009 | Clark ............................ 713/320 |
| 7,500,123 | B2 | 3/2009 | Luong et al. |
| 7,504,800 | B2 | 3/2009 | Culbert et al. |
| 7,529,948 | B2 | 5/2009 | Conroy et al. |
| 7,562,234 | B2 | 7/2009 | Conroy et al. |
| 7,664,970 | B2 | 2/2010 | Jahagirdar |

(Continued)

OTHER PUBLICATIONS

Wlzzard, NVIDIA GeForce GTX Kepler 2 GB Review, Mar. 2012, retrieved from http://www.techpowerup.com/reviews/NVIDIA/GeForce_GTX_680/30.html>> on Aug. 7, 2015.*

(Continued)

*Primary Examiner* — Xiao Wu
*Assistant Examiner* — Michael J Cobb
(74) *Attorney, Agent, or Firm* — Meyertons, Hood, Kivlin, Kowert & Goetzel, P.C.; Lawrence J. Merkel (57) ABSTRACT

In one embodiment, a system includes a power management controller that controls a duty cycle of a processor to manage power. By frequently powering up and powering down the processor during a period of time, the power consumption of the processor may be controlled while providing the perception that the processor is continuously available. Additionally, in some cases, it may be a better power/performance tradeoff to run the processor at a higher power/performance state if the processor is executing for a significant portion of the execution interval (e.g. the frame time for a GPU). Executing at a higher power/performance state may permit a realization of a greater number of frames per second for a given workload, in an embodiment.

18 Claims, 8 Drawing Sheets

(56) References Cited

U.S. PATENT DOCUMENTS

| | | | |
|---|---|---|---|
| 7,730,336 B2 | 6/2010 | Marinkovic et al. | |
| 7,788,516 B2 | 8/2010 | Conroy et al. | |
| 7,802,120 B2 | 9/2010 | Conroy et al. | |
| 7,849,332 B1 | 12/2010 | Alben et al. | |
| 7,861,013 B2 | 12/2010 | Hunkins et al. | |
| 7,903,116 B1* | 3/2011 | Klock et al. | 345/501 |
| 8,010,822 B2 | 8/2011 | Marshall et al. | |
| 8,028,185 B2 | 9/2011 | Branover et al. | |
| 8,856,566 B1* | 10/2014 | Jane | 713/320 |
| 8,924,752 B1* | 12/2014 | Law et al. | 713/322 |
| 2004/0039954 A1 | 2/2004 | White et al. | |
| 2007/0067136 A1 | 3/2007 | Conroy et al. | |
| 2007/0238437 A1 | 10/2007 | Jaakkola | |
| 2008/0031279 A1 | 2/2008 | Hatakeyama | |
| 2009/0007123 A1 | 1/2009 | Sreedharan et al. | |
| 2009/0222654 A1 | 9/2009 | Hum et al. | |
| 2009/0284534 A1 | 11/2009 | Hendry et al. | |
| 2009/0299543 A1 | 12/2009 | Cox et al. | |
| 2009/0309885 A1 | 12/2009 | Samson et al. | |
| 2010/0103147 A1 | 4/2010 | Sumpter | |
| 2011/0023040 A1 | 1/2011 | Hendry et al. | |
| 2011/0055596 A1* | 3/2011 | Wyatt | 713/300 |
| 2011/0106935 A1 | 5/2011 | Srinivasan | |
| 2011/0145619 A1 | 6/2011 | Ho et al. | |
| 2011/0148890 A1 | 6/2011 | Kaburlasos et al. | |
| 2012/0054519 A1 | 3/2012 | Branover et al. | |
| 2012/0146708 A1* | 6/2012 | Naffziger et al. | 327/512 |
| 2012/0166845 A1* | 6/2012 | Henry et al. | 713/323 |
| 2013/0080816 A1 | 3/2013 | Johnson et al. | |
| 2013/0155073 A1* | 6/2013 | Khodorkovsky et al. | 345/501 |
| 2013/0326250 A1* | 12/2013 | Sullivan et al. | 713/323 |
| 2014/0344429 A1 | 11/2014 | Baumann | |

OTHER PUBLICATIONS

AMD, FirePro Graphics: AMD PowerTuneTechnology, May 2011, PowerTune Technology Whitepaper, pp. 1-4.*

Office Action from U.S. Appl. No. 131329,675, issued Feb. 26, 2014, pp. 1-23.

U.S. Appl. No. 13/090,459, filed Apr. 20, 2011, Patrick Y. Law.

Ryan Smith, "AMD's Radeon HD 6970 & Radeon HD 6950: Paving the Future for AMO," AnandTech, Dec. 15, 2010, pp. 1-44.

Josh Venning, "ATI Mobility Radeon X1600 First Look," AnandTech, Dec. 5, 2005, pp. 1-3.

Anand Lal Shimpi & Derek Wilson, "ATI Radeon HD 3870 & 3850: A Return to Competition," AnandTech, Nov. 15, 2007, pp. 1-16.

Matthew Witheiler, "ATI Mobility Radeon 9000: Raising the bar again," AnandTech, Aug. 29, 2002, pp. 1-12.

U.S. Appl. No. 13/329,675, filed Dec. 19, 2011, Jason P. Jane.

U.S. Appl. No. 61/656,719, filed Jun. 7, 2012, Gokhan Avkarogullari.

Anand Iyer, "Demystify Power Gating and Stop Leakage Cold", EE Times, Mar. 3, 2006, pp. 1-3.

* cited by examiner

GPU WITH DYNAMIC PERFORMANCE ADJUSTMENT

This application claims benefit of priority to U.S. Provisional Patent Application Ser. No. 61/656,719, filed on Jun. 7, 2012. The provisional application is incorporated herein by reference in its entirety. To the extent that anything in the provisional application is inconsistent with the material expressly set forth herein, the material expressly set forth herein controls.

BACKGROUND

1. Field of the Invention

This invention is related to power management in integrated circuits and systems employing integrated circuits.

2. Description of the Related Art

As the number of transistors included on an integrated circuit "chip" continues to increase, power management in the integrated circuits continues to increase in importance. Power management can be critical to integrated circuits that are included in mobile devices such as personal digital assistants (PDAs), cell phones, smart phones, laptop computers, net top computers, etc. These mobile devices often rely on battery power, and reducing power consumption in the integrated circuits can increase the life of the battery. Additionally, reducing power consumption can reduce the heat generated by the integrated circuit, which can reduce cooling requirements in the device that includes the integrated circuit (whether or not it is relying on battery power).

Clock gating is often used to reduce dynamic power consumption in an integrated circuit, disabling the clock to idle circuitry and thus preventing switching in the idle circuitry. Additionally, some integrated circuits have implemented power gating to reduce static power consumption (e.g. consumption due to leakage currents). With power gating, the power to ground path of the idle circuitry is interrupted, reducing the leakage current to near zero.

Power gating can be an effective power conservation mechanism. On the other hand, power gating reduces performance because the power gated circuitry cannot be used until power is restored and the circuitry is initialized for use. The tradeoff between performance (especially perceived performance from the user perspective) and power conservation is complex and difficult to manage.

SUMMARY

In one embodiment, a system includes a power management controller that controls a duty cycle of a processor to manage power. The duty cycle may be the amount of time that the processor is powered on as a percentage of the total time to complete a task. By frequently powering up and powering down the processor during a period of time, the power consumption of the processor may be controlled while providing the perception that the processor is continuously available. For example, the processor may be a graphics processing unit (GPU), and the period of time over which the duty cycle is managed may be an amount of time that a frame is displayed on the display screen viewed by a user of the system.

Additionally, in some cases, it may be a better power/performance tradeoff to run the processor at a higher power/performance state if the processor is executing for a significant portion of the execution interval (e.g. the frame time for a GPU). Executing at a higher power/performance state may permit a realization of a greater number of frames per second for a given workload, in an embodiment. In an embodiment, the frame processing may complete more quickly, which may result in better performance with a small impact on power consumption. In an embodiment, the threshold utilization for moving to a higher power/performance state may be set higher than typical applications consume. In such an embodiment, higher performance may be available for demanding applications while not impacting the battery life for typical applications.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be "configured to" perform the task even when the unit/circuit/component is not currently powered on, because it includes the circuitry that implements the task. In general, the circuitry that forms the structure corresponding to the task may include hardware circuits and/or memory. The memory may store program instructions that are executable to implement the operation. The memory can include volatile memory such as static or dynamic random access memory. Additionally or in the alternative, the memory may include nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Overview

Figure 1:
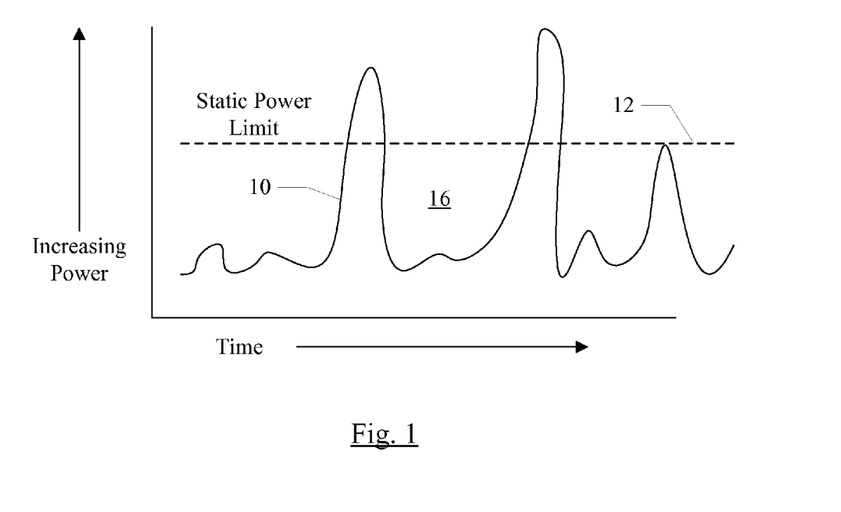
FIG. 1 is a diagram illustrating power consumption over time.

FIG. 1 is a diagram illustrating an example of dynamic power consumption over time in a processor (such as a GPU, for example). The dynamic power wave form 10 may increase at times of higher workload in the GPU, and may decrease at other times when the GPU is not busy. If a static power limit (dotted line 12) were implemented to control temperature and/or power consumption in the system, the performance of the processor would be capped such that its peak power stays under the static limit. That is, the GPU would be throttled, which may result in dropped frames or other visible discontinuities that are undesirable in the user experience. On the other hand, there may be times in which the power consumption is significantly below the limit (e.g. area 16 in FIG. 1).

In one embodiment, the power manager controller (PMGR) described below may be configured to manage the duty cycle of a processor to control its power consumption. The PMGR may be configured to permit the processor to temporarily exceed a power budget for the processor, as long as the average power consumed remains within budget. The PMGR may implement a negative feedback loop based on the actual power consumed and the target power, and may use the error between the actual power and target power to control the duty cycle. The error in the case that the actual power is lower than the target power may be used for bursts of high power consumption when the workload of the processor increases.

Additionally, the PMGR may be configured to control a power/performance state of the processor based on the utilization of the processor. The PMGR may monitor the processor over execution intervals, where one cycle of the duty cycle mentioned above occurs in each execution interval. The utilization may refer to the fraction (or percentage) of the execution interval is actually used by the processor to perform a task assigned to the processor for the execution interval. More particularly, in one embodiment, the utilization may be measured over a window of time that covers multiple execution intervals. Such a measurement of utilization may serve as a low pass filter on the utilization measurement. Thus, the utilization may be the percentage of active execution over the window of time in such embodiments. In an embodiment, the utilization window may be measured over times between idle times in the GPU. Accordingly, an execution interval and a utilization window may each be a unit of time. The execution intervals may be equal in size, in one embodiment. In one embodiment, the processor is a GPU and the execution interval is a frame time. The frame time may be the amount of time allotted for the GPU to perform the processing associated with one frame (e.g. an image for display). The utilization window may be multiple frame times long, and may advance in units of frame times or in units smaller than a frame time, in various embodiments.

Based on the utilization, the PMGR may determine a power/performance state for the processor. The power/performance state may generally be a configuration of the processor that may provide a given level of processor performance at a given power consumption. In an embodiment, the power/performance state may include a power supply voltage magnitude and an operating frequency. The power supply voltage magnitude may be the magnitude of the power supply voltage supplied to the processor (measured with respect to ground, or $V_{SS}$ in a CMOS integrated circuit). The operating frequency may be the frequency of the clock or clocks supplied to the processor. The higher the operating frequency and voltage, the higher the performance and the power consumption. The combination of power supply voltage magnitude and operating frequency may also be referred to as a power/performance level. Higher voltage magnitudes and frequencies may be viewed as higher levels than other levels. Equivalently, lower voltage magnitudes and frequencies may be viewed as lower levels than other levels.

As mentioned above, increasing the performance/power state of the processor may permit increased performance with little to no additional total energy consumption. For example, if the workload is static, increasing the power/performance state increases the power consumption per unit time by also allows the processor to complete the workload more rapidly. Accordingly, the total power consumption impact may not be significant. In other cases, the duty cycle may be 100% and the desired performance may not be achieved at a given power/performance state. For example, in the case of a GPU, an application may not be achieving the desired number of frames per second. At a higher power/performance state, the desired number of frames per second may be achieved.

Some of the embodiments below use a GPU as an example of the processor for which the PMGR is used. However, other embodiments may implement the PMGR with any processor (e.g. a central processing unit (CPU), other special purpose processors such as input/output processors (IOPs), digital signal processors (DSPs), embedded processors, microcontrollers, etc.). Still further, other embodiments may implement the power management to control fixed-function circuitry.

Figure 2:
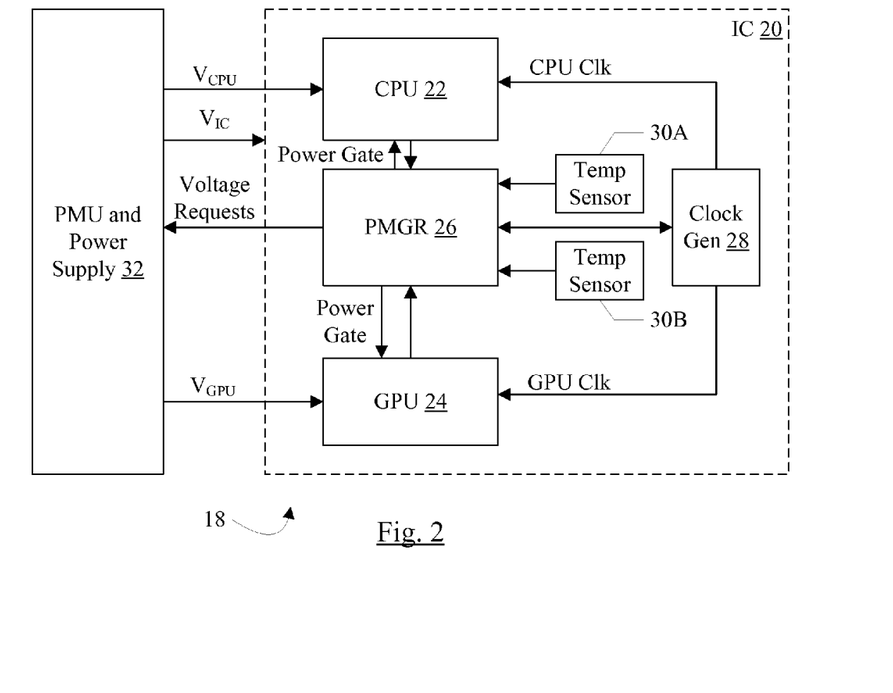
FIG. 2 is a block diagram of one embodiment of a system.

FIG. 2 is a block diagram of one embodiment of a system 18. In the illustrated embodiment, the system 18 includes an integrated circuit (IC) 20 which may be a system on a chip (SOC) in this embodiment. The IC 20 includes various processors such as a CPU 22 and a GPU 24. The IC 20 further includes a power manager controller (PMGR) 26, a clock generator 28, and one or more temperature sensors 30A-30B. The system 18 also includes a power management unit (PMU) and power supply 32.

The PMGR 26 is configured to generate voltage requests to the PMU and power supply 32, which is configured to supply the requested voltages on one or more voltage inputs to the IC 20. More particularly, the PMGR 26 may be configured to transmit a request for a desired power supply voltage magnitude (including a magnitude of zero when the corresponding circuitry is to be powered down, in some embodiments). The number of independent power supply voltage inputs supported by the IC 20 may vary in various embodiments. In the illustrated embodiment, the $V_{GPU}$ input is supported for the GPU 24 along with a $V_{CPU}$ input for the CPU 22 and a $V_{IC}$ input for the rest of the integrated circuit 20. Each voltage input may be provided to multiple input pins on the integrated circuit 20 to support enough current flow and power supply voltage stability to the supplied circuitry. Other embodiments may power the CPU with a separate supply but the GPU may receive the $V_{IC}$ supply. Still other embodiments may include other non-CPU voltage supplies besides the $V_{GPU}$ and $V_{IC}$ inputs.

The supply voltage to power-gated circuits such as the GPU 24 may be controlled via voltage requests from the PMGR 26, but may also be controlled via power gate controls issued internally by the PMGR 26 (e.g. the Power Gate control signals shown in FIG. 2). Gating the power internally may be performed more quickly than issuing voltage requests to the PMU and power supply 32 (and powering up may be performed more quickly as well). Accordingly, voltage requests to the PMU and power supply 32 may be used to vary the magnitude of the supply voltage (to adjust a power/performance state of the GPU 24), and the power gating during times that the GPU 24 is sleeping (or off) may be controlled internal to the IC 20.

As mentioned above, the PMGR 26 may implement a negative feedback loop to control power consumption in the GPU 24. The PMGR 26 may be configured to adjust the duty cycle of the GPU 24 responsive to the error between a target power and the actual power. Generally, the duty cycle may be viewed as a limit to the percentage of time that the GPU 24 is on (not power-gated) in a given period of time. For example, the duty cycle and utilization may be measured over a frame time, where a frame time is the period of time elapsing for the display of one frame on a display device such as monitor, a touch screen display, etc.

The target power may be determined in a variety of fashions. For example, the target power may be programmed in a register in the PMGR 26. Alternatively, the target power may be based on the operating temperature in the system (e.g. as measured by the temperature sensors 30A-30B). In yet another example for a portable system that operates on a limited power supply such as a battery, the target power may be based on the remaining battery life. Combinations of the above factors and/or other factors may be used to determine the target power.

The actual power consumed may be measured. Alternatively, the actual power may be estimated as a function of the activity in the GPU 24 and a profile of the power consumption of various parts of the GPU 24. The profile may be based on simulation of the GPU 24 design and/or based on measurements of the GPU 24 in operation.

Figure 3:
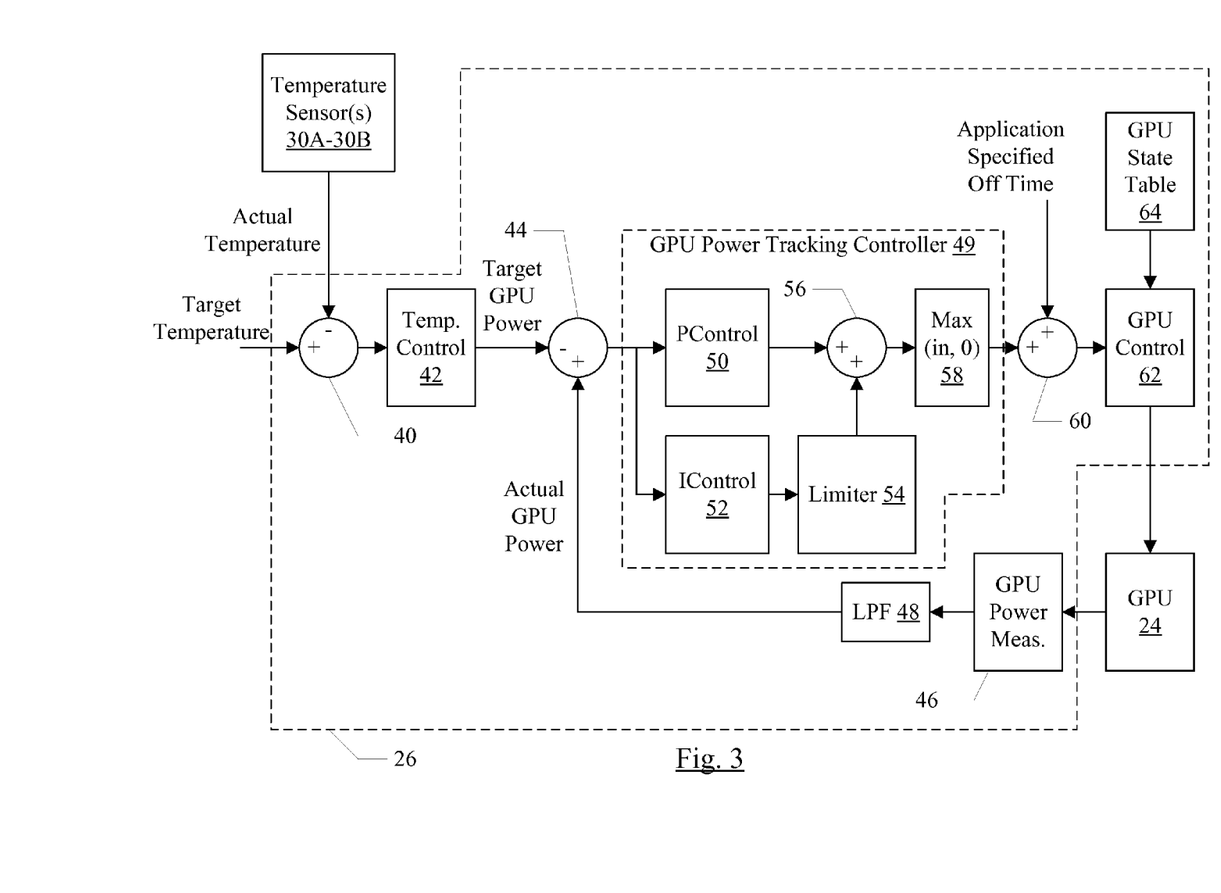
FIG. 3 is a block diagram of one embodiment of a graphics processing unit (GPU) and related power management blocks.

The PMGR 26 and/or various components thereof such as shown in FIG. 3 in an embodiment may be implemented as any combination of hardware circuitry and/or instructions executed on one or more processors such as the CPU 22 and/or the GPU 24. The instructions may be stored on a computer accessible storage medium such as that shown in FIG. 8. Accordingly, a power management unit, power control unit, or controller may be any combination of hardware and/or software stored on a computer accessible storage medium, in various embodiments.

The clock generator 28 may supply clocks to the CPU (CPU Clk in FIG. 2), the GPU (GPU Clk in FIG. 2), the PMGR 26, and any other circuitry in the IC 20. The clock generator 28 may include any clock generation circuitry (e.g. one or more phase lock loops (PLLs), digital delay lock loops (DLLs), clock dividers, etc.). The clock generator 28 may be programmed by the PMGR 26 to set the desired clock frequencies for the CPU clock, the GPU clock, and other clocks.

The CPU 22 may be any type of processor and may implement an instruction set architecture. Particularly, the CPU 22 may implement any general purpose instruction set architecture. The CPU 22 may have any microarchitecture, including in-order or out-of-order, speculative or non-speculative, scalar or superscalar, pipelined, multithreaded, etc.

The GPU 24 may implement any graphics application programming interface (API) architecture. The graphics API architecture may define an abstract interface that is specially purposed to accelerate graphics operations. The GPU 24 may further support various languages for general purpose computation (e.g. OpenCL), etc.

The temperature sensors 30A-30B may be any type of temperature sensing circuitry. When more than one temperature sensor is implemented, the temperature sensors may be physically distributed over the surface of the IC 20. In a discrete implementation, the temperature sensors may be physically distributed over a circuit board to which the discrete components are attached. In some embodiments, a combination of integrated sensors within the IC and external discrete sensors may be used.

It is noted that, while the illustrated embodiment includes components integrated onto an IC 20, other embodiments may include two or more ICs and any level of integration or discrete components.

Power Consumption Control

Turning next to FIG. 3, a block diagram of one embodiment of the PMGR 26 is shown in greater detail. The GPU 24 and the temperature sensors 30A-30B are shown as well. In the illustrated embodiment the PMGR includes a summator 40 coupled to receive an actual temperature measurement from the temperature sensors 30A-30B and a target temperature (e.g. that may be programmed into the PMGR 26, for example, or that may be set as a software parameter). As illustrated by the plus and minus signs on the inputs to the summator 40, the summator 40 is configured to take the difference between the target temperature and the actual temperature. The resulting temperature difference may be provided to a temperature control unit 42 which may output a target GPU power to a summator 44. The summator 44 may receive the actual GPU power from a GPU power measurement unit 46 (through a low pass filter (LPF) 48 in the illustrated embodiment). The output of the summator 44 may be the difference between the actual GPU power and the target GPU power (as illustrated by the plus and minus signs on the inputs), and may be an error in the power tracking. The difference may be input to a GPU power tracking controller 49. In the illustrated embodiment, the GPU power tracking controller 49 may include a proportional controller (PControl) 50, an integral controller (IControl) 52, a limiter 54, a summator 56, and a Max block 58. Thus, in the illustrated embodiment, the GPU power tracking controller 49 may be a proportional-integral (PI) controller. More particularly in the illustrated embodiment, the difference output from the summator 44 may be input to the PControl 50 and the IControl 52. The output of the IControl 52 may be passed through a limiter 54 to a summator 56 which also receives the output of the PControl 50, the output of which may passed through a Max block 58 to ensure that it is greater than zero. The output of the Max block 58 may be added to an application specified off time in the summator 60 to produce a desired duty cycle. A GPU control unit 62 may receive the duty cycle, and may control the on/off of the GPU 24 in response. Additionally, the GPU control unit 62 may implement the power/performance state changes described herein. The available power/performance states may be stored in a GPU state table 64.

The summator 44 may be the beginning of the negative feedback loop that is configured to track the power error and is configured to attempt to minimize the error of the actual power exceeding the target power. In this embodiment, the actual power may be less than the target power by any amount. Other embodiments may also limit the difference between the actual power and the target power below a lower threshold, for example, to improve performance. In the illustrated embodiment, a proportional-integral (PI) control may be implemented in the GPU power tracking controller 49. The proportional component of the control may be configured to react to the current error, while the integral component may be configured to react to the error integrated over time. More particularly, the integral component may be configured to eliminate the steady state error and control the rate at which the target GPU power is reached. The amount of integral control may be limited through the limiter 54, in some embodiments, as desired. Generally, the gains of both the proportional controller 50 and integral controller 52 may be programmable, as may the limiter 54.

The summator 56 may be configured to sum the outputs of the proportional controller 50 and the limiter 54, generating a value that may be inversely proportional to the duty cycle to be implemented by the GPU control unit 62. The block 58 may ensure that the output is positive, effectively ignoring the case where the actual power is less than the target power. Together, the components 44, 50, 52, 54, 56, and 58 may be referred to as the duty cycle controller herein. In other embodiments, the duty cycle controller may output the duty cycle itself.

In the illustrated embodiment, the operation of the feedback loop may be exposed to applications. Some applications may attempt to control GPU power consumption at a higher level of abstraction, and the applications' efforts may interfere with the operation of the PMGR 26. By providing exposure to the application, the PMGR 26 may permit the application to have an effect on loop operation and thus the application developer may no longer include application-level efforts to control GPU power. In other embodiments, application input may not be provided and the summator 60 may be eliminated. In the illustrated embodiment, the application may specify an off time for the GPU during a given frame time.

While PI control is shown in FIG. 3 for the GPU power tracking controller 49, other embodiments may implement other control units such as including derivative control (PID), or any other subcombination of proportional, integral, and derivative control. Still further, any other control design may be used (e.g. table based).

Figure 5:
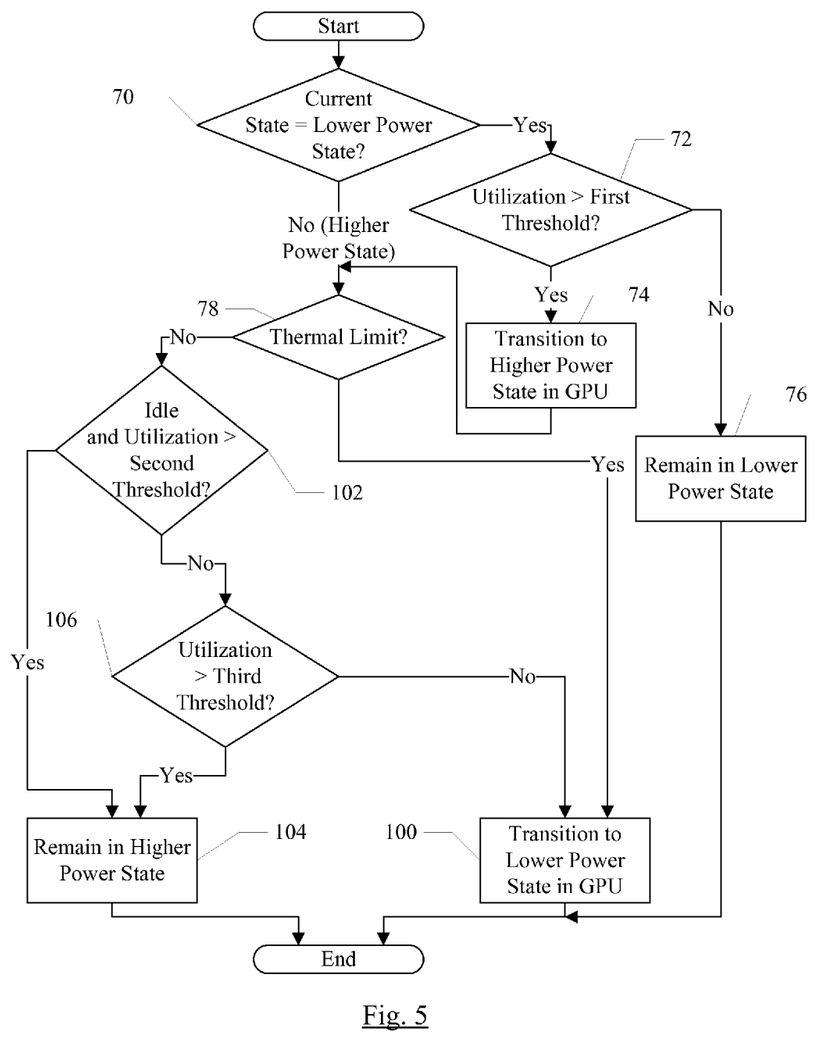
FIG. 5 is a flowchart illustrating operation of one embodiment of a GPU control unit shown in FIG. 3.
Figure 6:
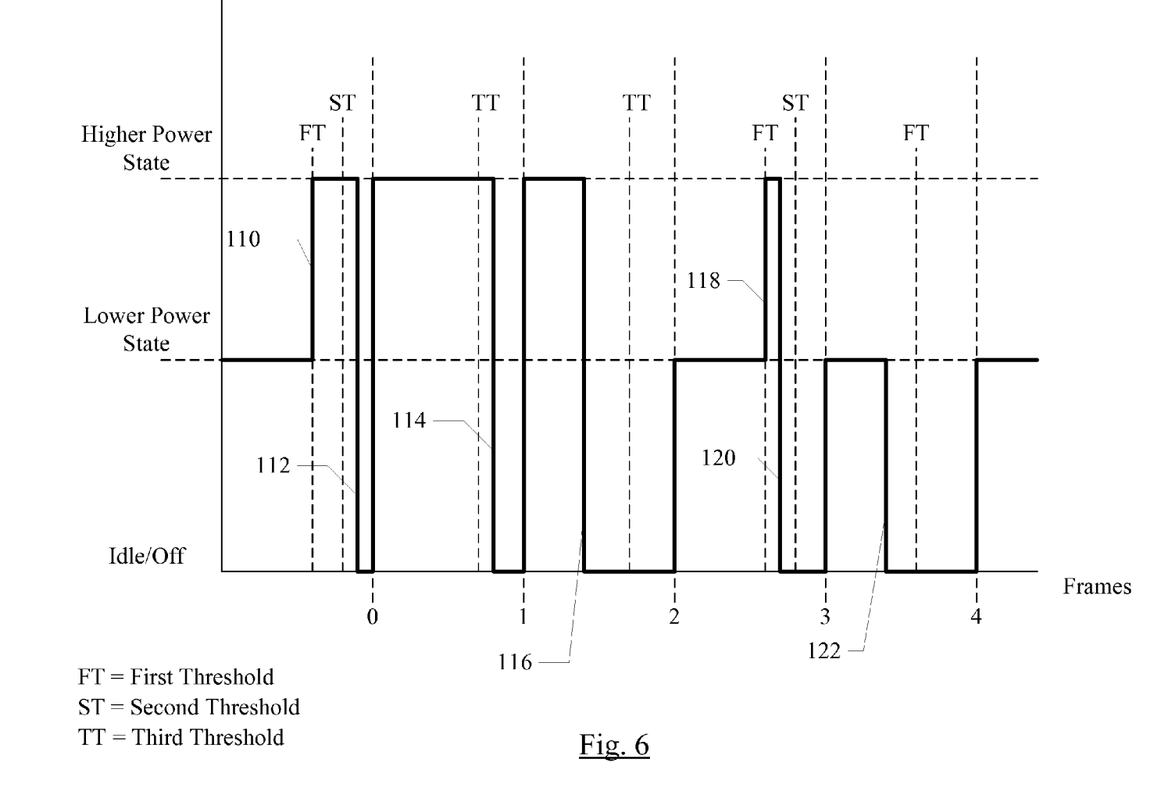
FIG. 6 is a timing diagram of several frame times illustrating operation of one embodiment of the GPU control unit illustrated in FIGS. 3 and 5.

The GPU control unit 62 may be configured to adjust the power/performance state of the GPU 24 based on the utilization of the GPU 24. The duty cycle indicated by the duty cycle controller (and converted to duty cycle by the GPU control unit 62, as discussed in more detail below) may serve as a limit to the active execution time in a given frame time, in order to meet thermal requirements, battery life requirements, etc. However, the actual active execution time may be smaller (e.g. if the GPU 24 is performing relatively simple operations each frame time, the actual active execution time may be lower than the duty cycle). The GPU control unit 62 may be configured to modify the power/performance state of the GPU 24 based on the measured utilization (over the utilization window) compared to one or more thresholds of utilization. The thresholds may be programmable or fixed, in various embodiments. One embodiment of the thresholds and an example of corresponding operation is shown in FIGS. 5 and 6 and is described in more detail below. However, other embodiments may implement any set of thresholds and power/performance state changes.

In one embodiment, the utilization thresholds may be dynamically varied. For example, if the power/performance state of the GPU 24 is cycling between a higher state and a lower state, the thresholds may be increased to reduce the cycling and increase the amount of time spent at the lower state. If the thresholds have been dynamically increased and the GPU 24 is remaining in the higher state, the thresholds maybe dynamically decreased. Additional details for one embodiment are described below with regard to FIG. 9.

In FIG. 3, the GPU control unit 62 is shown coupled to the GPU 24. The GPU control unit 62 may actually be coupled to the clock generator 28 (to change GPU clock frequency) and the PMU and power supply 32 (to request a different supply voltage magnitude). The GPU control unit 62 may be configured to record the current power/performance state of the GPU 24, and when the GPU control unit 62 determines that the power/performance state is to be changed, the GPU control unit 62 may be configured to read the new power/performance state from the GPU state table 64. That is, the GPU state table 64 may store the permissible power/performance states for the GPU 24, and the GPU control unit 62 may be configured to select the desired state from the states listed in the GPU state table 64.

In an embodiment, the GPU control unit 62 may be a combination of a power manager hardware unit configured to request voltages and clock frequencies and manage the transition there between, and software executed on either the CPU 22 or the GPU 24 to monitor the utilization and determine the desired power/performance states. The software may program the power manager hardware to request the desired power/performance states, and the power manager hardware may read the corresponding voltage magnitude and operating frequency from the GPU state table 64. Other embodiments may use different divisions.

The GPU power measurement unit 46 may be configured to measure the GPU power consumption. In some embodiments, the GPU power measurement unit 46 may estimate the power consumption based on the activity in the GPU 24. For example, the GPU power measurement unit 46 may be configured to read a variety of performance counters in the GPU 24. The values in the performance counters, along with factors derived from simulations of the GPU 24 or direct measurements on an implementation the GPU 24, may be used to estimate the power consumption. The factors may be programmable in the GPU power measurement unit 46, fixed in hardware, or any combination of programmable and fixed factors.

In an embodiment, power consumption measurements may be made on the order of once a millisecond, while the duty cycle controller may operate more slowly (e.g. on the order of once per second). Accordingly, the low pass filter 48 may filter the measurements to smooth out the measurements and reduce momentary spikes that might occur. The low pass filter 48 may effectively "bank" power that is not consumed (e.g. in the area 16 of FIG. 1) and may permit the power consumption to possibly exceed the power budget briefly after a period of low power consumption. Other embodiments may not require the filtering and the low pass filter 48 may be eliminated.

In the illustrated embodiment, the negative feedback loop to control power may be included within a thermal loop to control temperature. For example, in FIG. 3, the temperature measured by the temperature sensors 30A-30B may be compared to the target temperature, and the temperature control unit 42 may generate a target GPU power value responsive to the difference in the temperatures. As the actual temperature rises toward the target temperature (or perhaps surpasses the target temperature), the temperature control unit 42 may be configured to reduce the target GPU power value. By reducing power consumption in the GPU 24, the temperature may be reduced and thus may approach the target temperature or remain below the target temperature.

The temperature control unit 42 may implement any control mechanism. For example the temperature control unit 42 may include a table of temperatures and corresponding target power values. Alternatively, the temperature control unit 42 may implement PID control or any subset thereof, or any other control functionality. In other embodiments, other factors than temperature may be used to determine target power consumption. For example, desired battery life for a mobile device may be translated to target power consumption.

As mentioned above, in one embodiment, the PMGR 26 may be implemented in hardware, or a combination of hardware and software stored on a computer accessible storage medium. Specifically in an embodiment, the temperature control unit 42 may be implemented in software as part of an operating system executing in the system 18. The duty cycle controller (blocks 44, 50, 52, 54, 56, 58, and 60) may be implemented in a driver that is executed by the CPU 22 and that controls the GPU. Alternatively, the duty cycle controller may be implemented in a control thread that executes on the GPU 24 itself (referred to as GPU firmware). In other embodiments, the duty cycle controller may be implemented in a combination of GPU driver and firmware. Similarly, the GPU power measurement unit 46 may be implemented in firmware. It is noted that a summator may be any combination of hardware and/or software that produces a sum of the inputs to the summator (where an input having a minus sign may be negated into the sum and the sum may be a signed addition).

Figure 4:
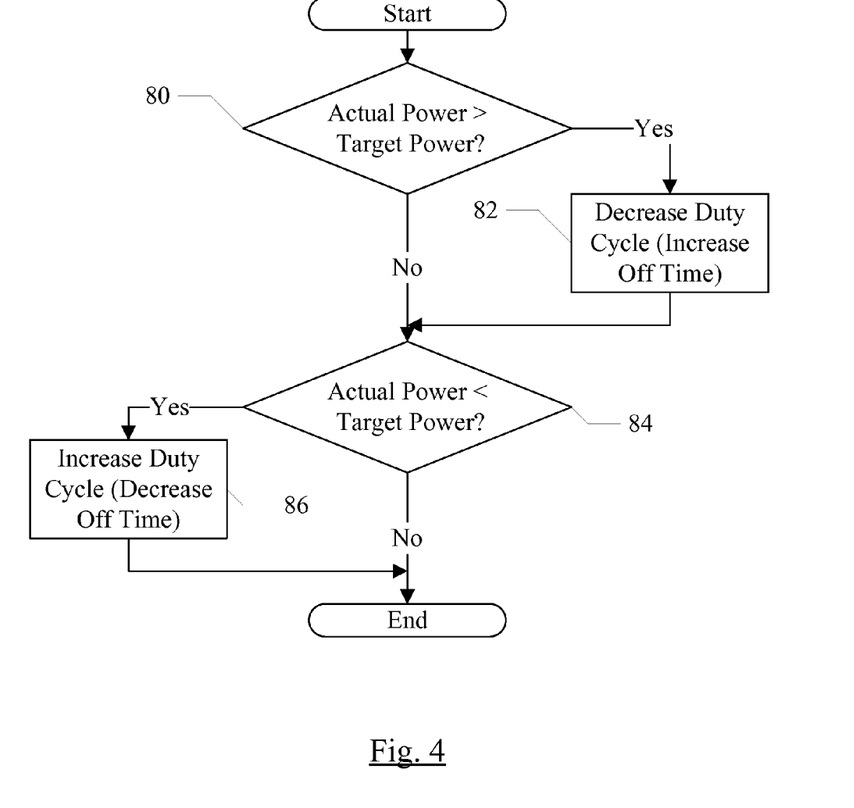
FIG. 4 is a flowchart illustrating operation of one embodiment of a duty cycle controller shown in FIG. 3.

Turning next to FIG. 4, a flowchart is shown illustrating operation of one embodiment of the duty cycle controller (e.g. the combination of the summators 44 and 56 and the GPU power tracking controller 49). While the blocks are shown in a particular order for ease of understanding, any order may be used.

If the actual power exceeds the target power (decision block 80, "yes" leg), the duty cycle controller may decrease the duty cycle (i.e. increase the off time) (block 82). The determination of the actual power exceeding the target power may be more than a simple mathematical comparison on the current actual power and the target power. For example, the low pass filter 48 may have captured the lack of power consumption during a time such as the area 16 in FIG. 1, and the actual power may be able to exceed the target power for a period of time to use the "unused" power from the previous low power consumption.

In some embodiments, if the target power is greater than the actual power, the duty cycle controller may not limit the utilization by controlling the duty cycle (e.g. the duty cycle may be increased up to 100%, or the off time may be zero) (decision block 84, "yes" leg and block 86).

Turning next to FIG. 5, a flowchart is shown illustrating operation of one embodiment of the GPU control unit 62. While the blocks are shown in a particular order for ease of understanding, any order may be used. The operation of FIG. 5 may be repeated continuously during use to update the power state of the GPU 24 as its workload changes over time. The GPU control unit 62 may be configured to implement the operation shown in FIG. 5.

The flowchart of FIG. 5 illustrates both determinations that are made during an execution interval to modify the current power/performance state dynamically for the execution interval and determinations that are made during an execution interval to determine the power/performance state for the next execution interval. The utilization (which, as mentioned previously, may be measured over a utilization window that may be multiple execution intervals in length) may be a factor in the determinations of either type. The discussion below identifies which are dynamic current state modifications and which are determinations for the next execution interval, for this embodiment. Additionally, the discussion refers to a lower power/performance state and a higher power/performance state (lower power state and higher power state in the discussion below, for brevity). Thus, at least two power/performance states are supported in this embodiment. The lower power/performance state may be, e.g., a minimum power supply voltage magnitude and corresponding operating frequency. The minimum power supply voltage magnitude may be the lowest power supply voltage magnitude at which the GPU 24 is designed to operate, and the corresponding operating frequency may be an operating frequency at which the GPU 24 is designed to operate when powered at the minimum power supply voltage. The higher power/performance state may be, e.g., a nominal power supply voltage magnitude near a center of a range of supported power supply voltage magnitudes (and a corresponding operating frequency at which the GPU 24 is designed to operate when powered at the nominal power supply voltage magnitude). Additional power/performance states may be defined in other embodiments, and transitions between the additional power/performance states based on utilization thresholds may be similar to those illustrated in FIG. 5. The values of the thresholds may vary between various pairs of power/performance states, in some embodiments.

If the current power/performance state is the lower power state (decision block 70, "yes" leg) and the utilization is greater than a first threshold (decision block 72, "yes" leg), the GPU control unit 62 may be configured to transition the GPU 24 to the higher power state (block 74). This transition may be a dynamic transition that occurs during the current frame time. If the current state is the lower power state (decision block 70, "yes" leg) but the utilization is not greater than the first threshold (decision block 72, "no" leg), the GPU 24 may remain in the lower power state (block 76). In one embodiment, the GPU control unit 62 may be configured to check the thermal limit as part of detecting that the utilization is greater than the first threshold, and may not dynamically transition to the higher power state if the thermal limit has been exceeded.

If the current state is the higher power state (decision block 70, "no" leg) or the GPU control unit 62 transitions the GPU 24 dynamically to the higher power state (decision blocks 70 and 72, "yes" legs), the thermal limit throttling from the temperature control unit 42 may be checked to ensure that the thermal limit has not been exceeded. If the thermal limit has been exceeded (decision block 78, "yes" leg), the GPU control unit 62 may be configured to transition to the lower power state for the GPU 24 (block 100). This transition may be dynamic in the current frame time, or may be determined for the next frame time, in various embodiments.

If the thermal limit has not been exceeded (decision block 78, "no" leg), the GPU control unit 62 may be configured to determine that the GPU 24 has become idle and the utilization when the GPU 24 became idle is greater than a second threshold (decision block 102). If so, (decision block 102, "yes" leg), the GPU control unit 62 may keep the GPU 24 in the higher power state (block 104). This determination may be for the next frame time. The GPU 24 may be idle if it has finished the work assigned to the GPU for the current frame time (that is, the GPU 24 is not limited by the duty cycle for the current frame time). In some embodiments, the GPU 24 may power down (under control of the GPU firmware) when it becomes idle. Additionally, if the utilization is greater than a third threshold (decision block 106, "yes" leg), the GPU control unit 62 may be configured to keep the GPU 24 in the higher power state (block 104). This determination may be for the next frame time. If neither of the decision blocks 102 and 106 are true (decision blocks 102 and 106, "no" legs), the GPU control unit 62 may be configured to transition the GPU 24 to the lower power state (block 100). This determination may be for the next frame time.

The thresholds may be set at any desired values, and may be programmable in some embodiments. In an embodiment, the second threshold is greater than the first threshold. In an embodiment, the second threshold is also greater than the third threshold. In an embodiment, the third threshold is greater than the first threshold. Exemplary thresholds for one embodiment may be: first threshold=65% of the utilization window, second threshold=90% of the utilization window, and third threshold=75% of the utilization window. Other embodiments may vary any of the percentages. In one embodiment, the first threshold may be set somewhat higher than the typical application uses at the lower power state. Thus, typical applications (which may be experiencing acceptable GPU performance) may experience no impact from the mechanism of FIG. 5 and thus may have the same power/performance characteristics with the mechanism, as compared to the characteristics prior to implementation of the mechanism. More demanding applications may experience a benefit, however.

Turning next to FIG. 6, a timing diagram is shown illustrating multiple frame times and an example of operation of one embodiment of the GPU control unit 62. Time is illustrated on the horizontal axis of the timing diagram, and is divided into frame times illustrated as 0 to 4 in this example. The vertical axis shows the lower and higher power states, and also the idle (or off) state. A heavy line illustrates the state of the GPU 24 for this example. The first, second, and third thresholds are illustrated as FT, ST, and TT, respectively, with vertical dashed lines within the various frame times. No thermal limiting occurs in this example.

In frame time 0, the GPU 24 begins operation in the lower power state. The GPU control unit 62 detects that the GPU 24 utilization exceeds the first threshold in frame time 0, and dynamically increases the GPU 24 to the higher power state (reference numeral 110). The GPU 24 completes execution and transitions to idle after the second threshold is exceeded (reference numeral 112), and thus the GPU control unit 62 determines that the power/performance state for frame 1 is the higher power state. Accordingly, in frame time 1, the GPU 24 begins operation in the higher power state. The GPU control unit 62 detects that the GPU 24 reaches idle after the third threshold has been reached in the utilization window (reference numeral 114), and thus determines that the power/performance state for frame 2 is the higher power state. During frame time 2, on the other hand, the GPU control unit 62 detects that the GPU 24 reaches idle before the third threshold has been reached in the utilization window (reference numeral 116). Accordingly, the GPU control unit 62 determines that the power/performance state for frame time 3 is the lower power state. During frame time 3, the GPU control unit 62 again detects that the GPU 24 is still executing as the utilization exceeds the first threshold, and dynamically increases the GPU 24 to the higher power state (reference numeral 118). In frame time 3, however, the GPU 24 reaches idle prior to the utilization reaching the second threshold (reference numeral 120). Accordingly, the GPU control unit 62 determines that the power/performance state for frame time 4 is the lower power state. In frame time 4, the GPU control unit 62 detects that the GPU 24 reaches idle and the utilization is lower than the first threshold (reference numeral 122), and thus determines that the power/performance state for frame time 5 is the lower power state.

Figure 7:
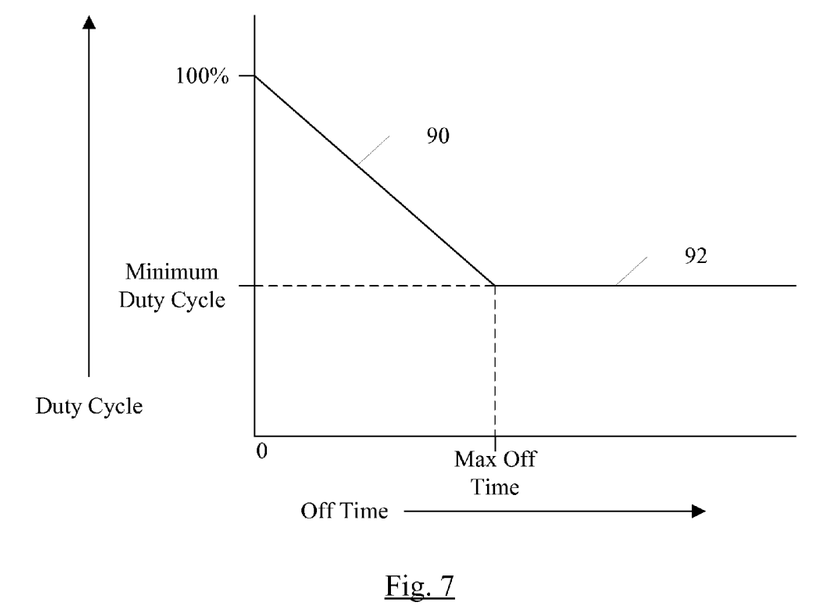
FIG. 7 is a diagram illustrating a transfer function between an output of a duty cycle controller and the duty cycle limit for the GPU control unit.

In one embodiment, the output of the duty cycle controller (e.g. the output of the summator 60 in FIG. 3) may be a value representing the off time for the GPU 24. The GPU control unit 62 may implement a transfer function converting the off time (or amount of throttling) to a duty cycle measurement. FIG. 7 is an example of such a transfer function. If the output of the duty cycle controller is zero (e.g. the actual power is less than or equal to the target power), the duty cycle may be 100%. As the duty cycle controller output (off time) increases to a maximum amount, the duty cycle may decrease to a minimum duty cycle (line 90). Once the minimum duty cycle/ maximum off time is reached, the duty cycle remains at the minimum duty cycle even if the off time output would otherwise be greater (line 92). The minimum duty cycle and/or maximum off time may be programmable or fixed in the PMGR 26, in various embodiments.

Dynamic Threshold Adjustment

As mentioned previously, there may be some cases in which the dynamic performance adjustments described above may be further improved with dynamic threshold adjustment. For example, an application may have utilization between the first and second thresholds as initially programmed for the GPU control unit 62. Such an application may cause the GPU control unit 62 to transition the GPU 24 to the higher power state in each frame, but then start the next frame at the lower power state. It may be desirable to execute at the lower power state for such an application. In another example, an application may have utilization that is near the second threshold and may have variation in workload from frame to frame. Such an application may transition to the higher power state in a frame, and may begin the next frame in the higher power state. The application may complete the next frame before the second threshold and may thus begin a still subsequent frame in the lower power state. Again, it may be desirable to execute at the lower power state for such an application. There may be additional cases, in other embodiments.

Figure 9:
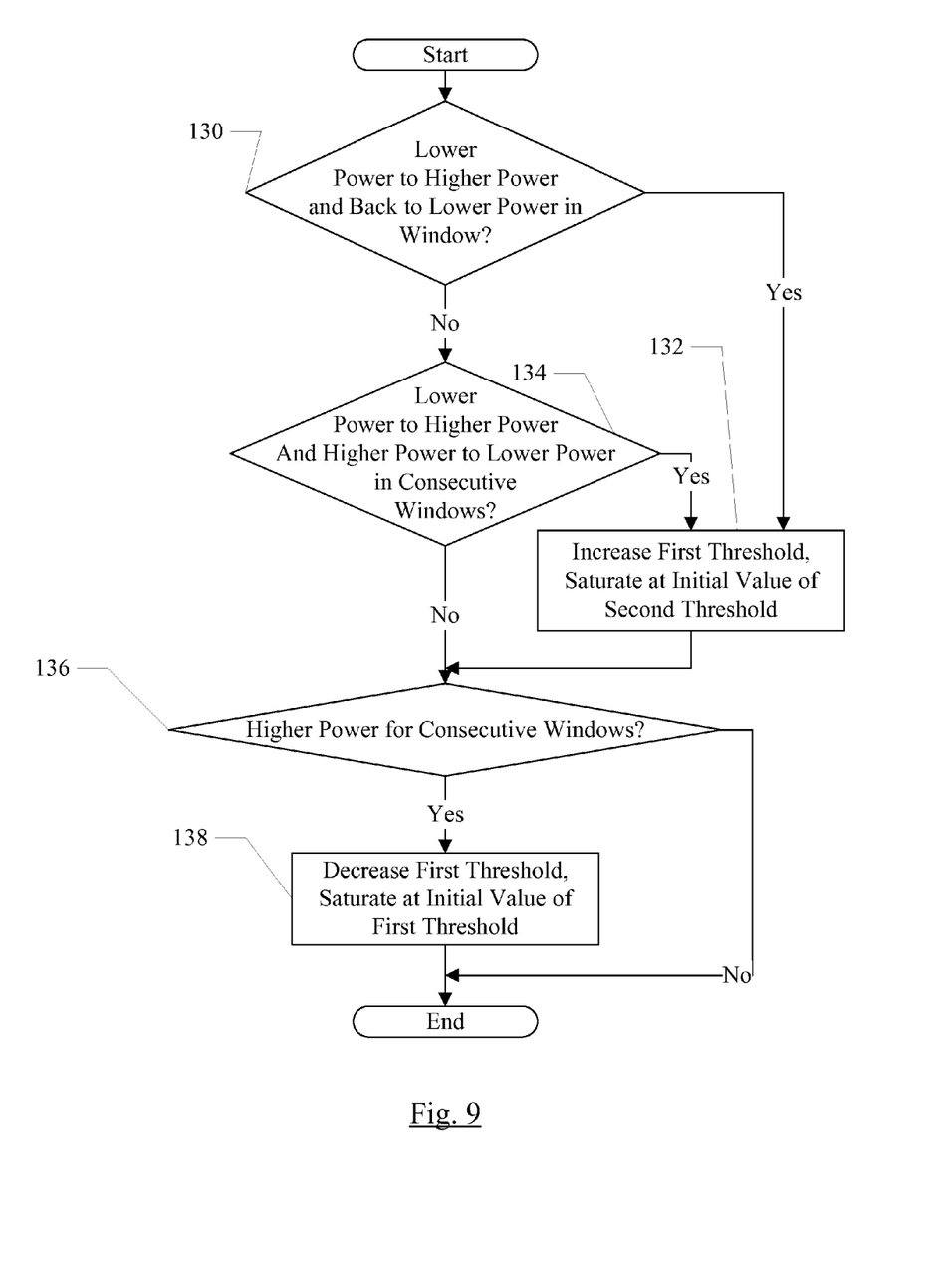
FIG. 9 is a flowchart illustrating operation of one embodiment of the GPU control unit shown in FIGS. 3 and 5 to perform dynamic threshold modification.

FIG. 9 is a flowchart illustrating operation of one embodiment of the GPU control unit 62 to implement dynamic threshold adjustment. While the blocks are shown in a particular order for ease of understanding, any order may be used. The GPU control unit 62 may be configured to implement the operation shown in FIG. 9.

The GPU control unit 62 may monitor the power state transitions for the GPU 24, and may be configured to detect that the power state transitioned from the lower power state to the higher power state and back to the lower power state within a given window (e.g. between two idle times). Such a pattern may be exhibited by the application in the first example mentioned above. If such a pattern is detected (decision block 130, "yes" leg), the GPU control unit 62 may be configured to dynamically increase the first threshold (block 132). The GPU control unit 62 may be configured to saturate the first threshold at an initial value programmed for the second threshold. That is, the GPU control unit 62 may not cause the first threshold to exceed the second threshold. The amount of increase in the first threshold may be a constant value for each increment, or may vary over time if the pattern continues to repeat even as the first threshold is increased. The size of the increase may grow or shrink as iterations of increase are performed, in various embodiments.

In an embodiment, the GPU control unit 62 may also be configured to detect another pattern by monitoring the GPU power state transitions. The second pattern may be the transition from the lower power state to the higher power state in one window, followed by transition from the higher power state to the lower power state in the next consecutive window (decision block 134). The second pattern may be exhibited by the application in the second example mentioned above. If such a pattern is detected (decision block 134, "yes" leg), the GPU control unit 62 may be configured to dynamically increase the first threshold (block 132). The amount of increase in this case may vary from the amount of increase performed in the first case (via decision block 130), in some embodiments. In addition or alternatively, the pattern of variation in the increase over time, if implemented, may be different for the cases. In other embodiments, the same increases may be performed for the various cases.

The GPU control unit 62 may generally keep the first threshold at its increased level from window to window (and may accumulate increases over time), in an embodiment. To return the first threshold level to its initial value (or to a lower value), the GPU control unit 62 may also be configured to detect that the GPU 24 operates in the higher power state for two (or more) consecutive windows while the first threshold is at an increased amount (decision block 136). If such a pattern is detected (decision block 136, "yes" leg), the GPU control unit 62 may be configured to decrease the first threshold (block 138). The decrease may be saturated at the initial value of the first threshold, in this embodiment. That is, the decrease may not reduce the first threshold below its initial value. Other embodiments may permit the decrease to go below the initial value.

It is noted that, in some embodiments, the GPU control unit 62 may monitor for multiple occurrences of a given pattern before adjusting the threshold. Additionally, one or more other thresholds may be dynamically adjusted in other embodiments, and other patterns in the power state transitions may be monitored for, in various embodiments.

Figure 8:
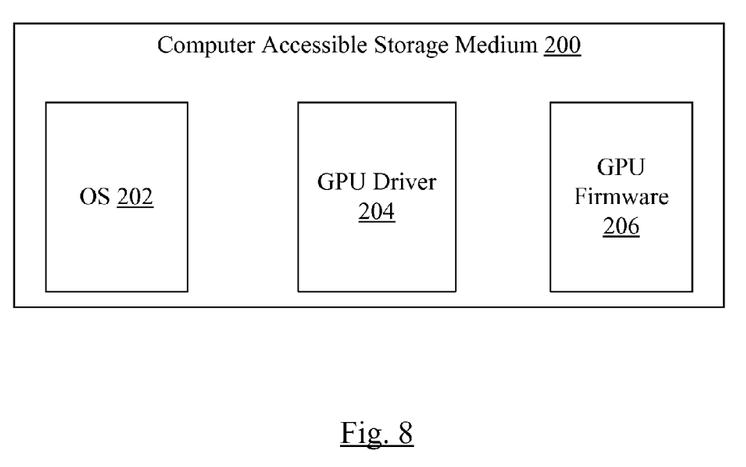
FIG. 8 is a block diagram of one embodiment of a computer accessible storage medium.

Turning now to FIG. 8, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. Storage media may also include non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link.

The computer accessible storage medium 200 in FIG. 8 may store an operating system (OS) 202, a GPU driver 204, and a GPU firmware 206. As mentioned above, the temperature control unit 42 may be implemented in the operating system 202, the power control to generate a duty cycle may be implemented in the GPU driver 204, and the GPU control unit 62 may be implemented in the GPU firmware 206. Each of the operating system 202, the GPU driver 204, and the GPU firmware 206 may include instructions which, when executed in the system 18, may implement the operation described above. In an embodiment, the OS 202 and the GPU driver 204 may be executed on the CPU 22, and the GPU firmware 206 may be executed on the GPU 24. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. An apparatus comprising:
a graphics processing unit (GPU); and
a power manager controller coupled to the GPU and configured to monitor power consumption in the GPU and to control a power/performance state of the GPU responsive to the power consumption, wherein:
the power manager controller is configured to determine a utilization of the GPU at a time that the GPU is operating at a lower power/performance state of a plurality of power/performance states;
the power manager controller is configured to cause the GPU to operate at a higher power/performance state during an execution interval responsive to the utilization exceeding a first threshold;
the power manager controller is further configured to monitor transitions in the power/performance state of the GPU over a plurality of the execution intervals and, responsive to detecting one or more patterns in the transitions over the plurality of the execution intervals, the power manager controller is configured to dynamically modify the first threshold; and
the power manager controller is configured to increase the first threshold responsive to a first pattern of the one or more patterns and to decrease the first threshold responsive to a second pattern of the one or more patterns.

2. The apparatus as recited in claim 1 wherein the power manager controller is configured to detect that the GPU reaches an idle condition during the execution interval, and wherein the GPU is configured to operate the GPU at the higher power/performance state in a next execution interval responsive to the GPU reaching the idle condition and further responsive to the utilization exceeding a second threshold.

3. The apparatus as recited in claim 2 wherein the power manager controller is configured to detect that the utilization in a next execution interval exceeds a third threshold, and wherein the power manager controller is configured to cause the GPU to operate at the higher power/performance state in a second next execution interval responsive to the utilization exceeding the third threshold.

4. The apparatus as recited in claim 3 wherein the third threshold is greater than the first threshold and the second threshold is greater than the third threshold.

5. The apparatus as recited in claim 1 wherein the power manager controller is configured to cause the GPU to operate at the lower power/performance state responsive to a thermal limit being reached in the apparatus.

6. The apparatus as recited in claim 1 wherein the execution interval is a frame time in which a frame for display is processed by the GPU.

7. A method comprising:
operating a graphics processing unit (GPU) at a first power/performance level during a frame time;
monitoring power consumption of the GPU;
detecting that a utilization of the GPU exceeds a first threshold while operating at the first power/performance level;
transitioning the GPU to a second power/performance level during the frame time responsive to detecting that the utilization exceeds the first threshold, wherein the second power/performance level is higher than the first power/performance level;
monitoring transitions in the power/performance level of the GPU over a plurality of frame times;
detecting one or more patterns in the transitions over the plurality of frame times; and dynamically modifying the first threshold responsive to detecting the one or more patterns, wherein dynamically modifying includes increasing the first threshold responsive to a first pattern of the one or more patterns and decreasing the first threshold responsive to a second pattern of the one or more patterns.

8. The method as recited in claim 7 further comprising:
detecting an idling of the GPU during the frame time, wherein the utilization at the idling exceeds a second threshold;
initiating a second frame time on the GPU; and
operating the GPU at the second power/performance level in the second frame time responsive to detecting the idling.

9. The method as recited in claim 8 further comprising:
detecting that the utilization exceeds a third threshold in the second frame time; and
operating the GPU at the second power/performance level during a third frame time responsive to detecting that the utilization exceeds the third threshold.

10. The method as recited in claim 9 wherein the first power/performance level comprises a first operating frequency and the second power/performance level comprises a second operating frequency, and wherein the second operating frequency exceeds the first operating frequency.

11. The method as recited in claim 10 wherein the first power/performance level comprises a first power supply voltage magnitude and the second power/performance level comprises a second power supply voltage magnitude, and wherein the second power supply voltage magnitude exceeds the first power supply voltage magnitude.

12. The method as recited in claim 7 further comprising:
detecting that the utilization exceeds a third threshold in a second frame time; and
operating the GPU at the second power/performance level during a third frame time responsive to detecting that the utilization exceeds the third threshold.

13. An integrated circuit comprising:
a processor; and
a power manager controller configured to operate the processor at one of a plurality of power/performance states, wherein:
execution in the processor is divided into a plurality of execution intervals;
the power manager controller is configured to determine which one of the plurality of power/performance states to select for the processor responsive to the utilization;
at least one transition between power/performance states is performed dynamically during a given execution interval responsive to a utilization of the processor exceeding a first threshold;
the power manager controller is further configured to monitor transitions between the plurality of power/performance states of the processor over the plurality of execution intervals and, responsive to detecting one or more patterns in the transitions over the plurality of execution intervals, the power manager controller is configured to dynamically modify the first threshold; and
the power manager controller is configured to increase the first threshold responsive to a first pattern of the one or more patterns and to decrease the first threshold responsive to a second pattern of the one or more patterns.

14. The integrated circuit as recited in claim 13 wherein the power manager controller is configured to operate the processor at a first power/performance state of the plurality of power/performance states during a first execution interval, and wherein the power manager controller is configured to dynamically change the first power/performance state to a second power/performance state of the plurality of power/performance states during the first execution interval responsive to the utilization exceeding the first threshold.

15. The integrated circuit as recited in claim 14 wherein the power manager controller is configured to detect that the processor transitions to idle in the first execution interval and, responsive to the transition to idle occurring and the utilization exceeding a second threshold, the power manager controller is configured to select the second power/performance state for a second execution interval subsequent to the first execution interval.

16. The integrated circuit as recited in claim 15 wherein the second threshold is greater than the first threshold.

17. The integrated circuit as recited in claim 13 wherein, responsive to operating the processor at the second power/performance state during a second execution interval and the utilization exceeding a third threshold, the power manager controller is configured to select the second power/performance state for a third execution interval subsequent to the second execution interval.

18. The integrated circuit as recited in claim 17 wherein the third threshold is greater than the first threshold.

* * * * *